(12) United States Patent
Ahmad et al.

(10) Patent No.: US 8,792,896 B2
(45) Date of Patent: Jul. 29, 2014

(54) BEAMFORMING FOR INCREASING CELL EDGE CAPACITY IN A HETEROGENEOUS NETWORK

(71) Applicant: Telefonaktiebolaget L M Ericsson (publ), Stockholm (SE)

(72) Inventors: Talha Ahmad, Nepean (CA); Gary Boudreau, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/647,753

(22) Filed: Oct. 9, 2012

(65) Prior Publication Data

US 2014/0099960 A1    Apr. 10, 2014

(51) Int. Cl.
*H04W 36/00* (2009.01)

(52) U.S. Cl.
USPC ........ 455/438; 455/436; 455/442; 455/422.1; 455/432.1; 455/435.1; 455/423; 455/418; 370/331

(58) Field of Classification Search
CPC .. H04W 36/00; H04W 8/087; H04W 28/0226
USPC ........ 455/438, 436, 442, 422.1, 432.1, 435.1, 455/423, 418; 370/331
See application file for complete search history.

(56) References Cited

U.S. PATENT DOCUMENTS

| 7,353,034 | B2 * | 4/2008 | Haney | 455/457 |
| 8,086,237 | B2 * | 12/2011 | Vela et al. | 455/442 |
| 2009/0286482 | A1 | 11/2009 | Gorokhov et al. | |
| 2010/0261493 | A1 | 10/2010 | Guey et al. | |

OTHER PUBLICATIONS

3GPP TS 36.213,LTE; Evolved Universal Terrestrial Radio Access (E-UTRA); Physical Layer procedures; V8.8.0 Release 8, (Oct. 2009).
Becker R., "Precoding and Spatially Multiplexed MIMO in 3GPP Long-Term Evolution", *High Frequency Electronics*, Oct. 2009, pp. 18-26.
Bergström M., "Analysis of Interference and Performance of Heterogeneously Deployed LTE Systems", *Master of Science Thesis*, Royal Institute of Technology, Stockholm, Oct. 2010, 105 Pages.
Dahlman, E. et al., "Key features of the LTE radio interface", *Ericsson Review No. 2*, 2008.
Duplicy, J. et al., "MU-MIMO in LTE Systems", *EURASIP Journal on Wireless Communications and Networking*, vol. 2011, Article ID 496763, 13 Pages.

(Continued)

*Primary Examiner* — Nghi H Ly
(74) *Attorney, Agent, or Firm* — Myers Bigel Sibley & Sajovec, P.A.

(57) ABSTRACT

Methods of communicating with a selected user equipment terminal (UE) in a first cell served by a base station and a remote radio head include forming a list of non-targeted UEs including other UEs in the first cell and cell edge UEs in a neighboring cell that borders the first cell that are located near a border of the first cell and the neighboring cell, generating a list of candidate precoding matrices that can be used to communicate with the selected UE from the base station and/or from the remote radio head, generating a list of available precoding matrices by discarding from the list of candidate precoding matrices those precoding matrices that may cause interference to at least one non-targeted UE, selecting a precoding matrix from the list of available precoding matrices, and communicating with the selected UE using the selected precoding matrix.

20 Claims, 12 Drawing Sheets

(56) References Cited

OTHER PUBLICATIONS

Freescale Semiconductor, "Long Term Evolution Protocol Overview", White Paper, Document No. LTEPTCLOVWWP, Rev 0 Oct. 2008; Accessed Nov. 16, 2011, http://www.freescale.com/files/wireless_comm/doc/white_paper/LTEPTCLVWWP.pdf.

Kwan, R. et al., "A Survey of Scheduling and Interference Mitigation in LTE", *Journal of Electrical and Computer Engineering*, vol. 2010, Article ID 273486, 10 Pages.

Landström S. "Sensitivity to traffic distribution assumptions and micro basestation position", EAB-10:027940, rev. A, 26 Pages.

Liang Y. et al., "Evolution of Base Stations in Cellular Networks: Denser Deployment vs Coordination", *IEEE ICC 2008 Conference*, May 2008, 5 pages.

Motorola, "Long Term Evolution (LTE): Overview of LTE Air-Interface", Technical White Paper, Accessed Mar. 2, 2013, http://www.motorola.com/web/Business/Solutions/Industry%20Solutions/Service%20Providers/Wireless%20Operators/LTE/_Document/Static%20Files/6993_MotDoc_New.pdf.

Parkvall, Dr. Stefan, "3G Evolution—HSPA and LTE for Mobile Broadband", Chapter 7—Scheduling, Link Adaptation and Hybrid ARQ, Feb. 29, 2008, 27 Pages.

Rohde & Schwarz, "LTE-Advanced Technology Introduction White Paper", http://www2.rohde-schwarz.com/file_13924/1MA169_2E.pdf.

Rohde & Schwarz, "UMTS Long Term Evolution (LTE) Technology Introduction", Sep. 2008, http://www2.rohde-schwarz.com/file_10948/1MA111_2E.pdf.

Teyeb, O. et al., "Dynamic Relaying in 3GPP LTE-Advanced Networks", *EURASIP Journal on Wireless Communications and Networking*, Article ID 731317, 2009.

Tian, R. "Scheduling, Link adaption and Hybrid ARQ", Chapter 7, *3G Evolution—HSPA and LTE for Mobile Broadband*, Apr. 2, 2009, 10 Pages.

U.S. Appl. No. 13/192,638, filed Jul. 28, 2011, "Beam Forming for Cell Edge Capacity Improvement in a Heterogeneous Network".

Universal Mobile Telecommunications System (UMTS); Evolved Universal Terrestrial Radio Access (E-UTRA); Physical layer for relaying operation (3GPP TS 36.216 version 10.3.1 Release 10), Oct. 2011.

Whitacre, J. "A Primer on MIMO in LTE", *Hearst Electronic Products*, Feb. 1, 2010, 4 Pages.

Wikipedia, "Link adaptation", accessed Aug. 7, 2012; http://en.wikipedia.org/wiki/Link_adaptation.

International Search Report and Written Opinion Corresponding to International Application No. PCT/IB2013/002194; Date of Mailing: Mar. 28, 2014; 10 Pages.

Lee et al. "Coordinated Multipoint Transmission and Reception in LTE-Advanced: Deployment Scenarios and Operational Challenges", *IEEE Communications Magazine*, Feb. 2012, 148-154.

Le et al. "Power-Efficient Downlink Transmission in Multicell Networks with Limited Wireless Backhaul", *IEEE Wireless Communications*, Oct. 2011, 82-88.

NTT DoCoMo, "Throughput Performance Evaluation of RE Muting for Inter-cell CSI-RS", 3GPP TSG RAN WG1 Meeting #62, R1-105433, Xian, China, Oct. 11-15, 2010, 6 Pages.

Motorola, "Interference Mitigation in Heterogeneous System via Beamforming and Frequency-Selective Scheduling", 3GPP TSG RAN #58bis, R1-093967, Miyzazki, Japan, Oct. 12-16, 2009, 3 Pages.

\* cited by examiner

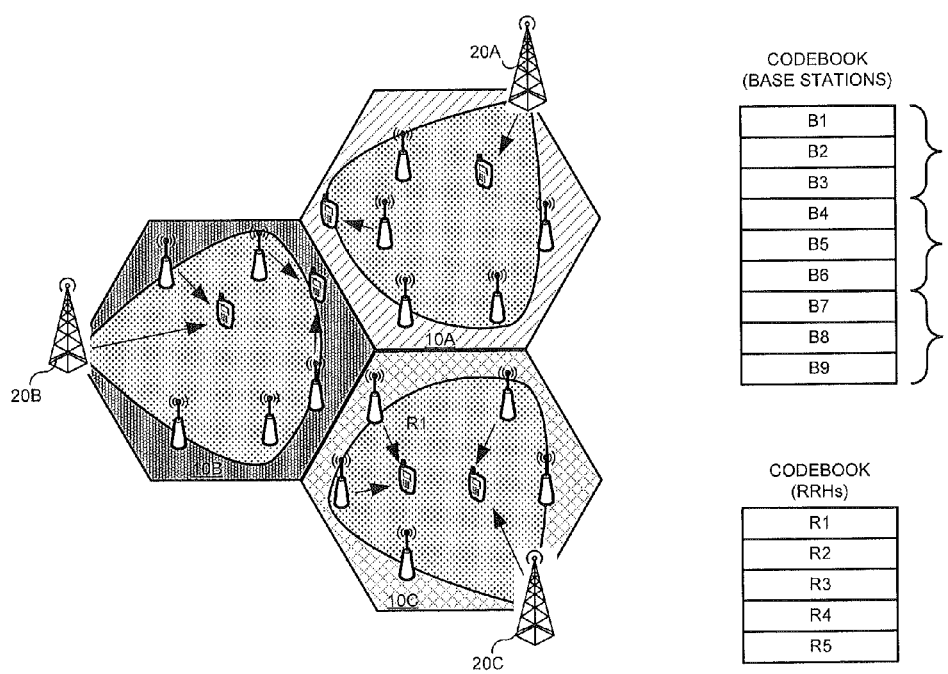
FIGURE 10
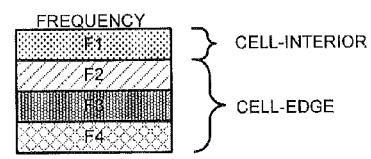

BEAMFORMING FOR INCREASING CELL EDGE CAPACITY IN A HETEROGENEOUS NETWORK

TECHNICAL FIELD

The present application relates generally to heterogeneous networks and, more specifically, to heterogeneous networks including remote radio heads.

BACKGROUND

The increasing demand for high data rates in cellular networks requires new approaches to meet this expectation. A challenging question for operators is how to evolve their existing cellular networks so as to meet the requirement for higher data rates. In this respect, a number of approaches are possible: i) increase the density of their existing base stations, ii) increase the cooperation between base stations, and/or iii) deploy smaller base stations (low power nodes, or LPNs) in areas where high data rates are needed within a base stations grid.

The option of deploying smaller base stations is in general referred to in the related literature as a "Heterogeneous Network", or "Heterogeneous Deployment" and the layer consisting of smaller base stations is termed a "micro", or "pico" layer. The larger base stations are then referred to in this context as "macro" base stations.

Building a denser macro base station grid, while simultaneously enhancing the cooperation between macro base stations (hence either using options i) or ii) above) is a solution that meets the requirement for higher data rates; however such an approach may not necessarily be a cost-efficient option, due to the costs and delays associated with the installation of macro base stations, especially in urban areas where these costs may be significant.

FIG. 1 shows the basic principle of heterogeneous deployments. Large macro cells 10, which are geographic areas nominally served by a base station, are generally able to provide coverage to a larger service area. However, the addition of smaller micro/pico cells 11 can improve network capacity in certain regions of those macro cells. Micro/pico cells are essentially subcells of a macro cell, and are served by low power, short range nodes, such as micro/pico base stations, using frequencies allocated by the macro base station. Allocation of resources between the macro and micro/pico cells can be semi-static, dynamic or shared across the macro-micro/pico layers.

One of the main objectives of micro/pico layers is to offload as many users as possible from the macro layers to the micro/pico layers. In an ideal scenario, this may enable users to experience higher data rates in both the macro and micro/pico layers.

In this respect, several techniques have been discussed and proposed within 3GPP. One proposal is to extend the range of small cells by using cell specific cell selection offsets. A cell selection offset is an additional power margin for a cell that must be overcome before a handover to the cell will occur. Setting the cell selection offset for a particular microcell to a negative value can therefore increase the probability of a handover occurring to the microcell, thereby extending the range of the microcell. Another proposed approach is to increase the transmission power of low power nodes and simultaneously setting appropriately the uplink (UL) power control target P0 for the users connected to low power nodes.

The solution of deploying small base stations within the already existing macro layer grid is an appealing option, since these smaller base stations are anticipated to be more cost-efficient than macro base stations, and their deployment time is expected to be shorter as well. Even so, there will be scenarios in which deployment of pico- or macro-base stations and their associated backhaul costs may be prohibitive. In such scenarios, the use of relay nodes that employ in-band backhaul communications may provide a viable option that provides pico cell type coverage either indoors or outdoors and mitigates the cost and effort of deploying land-line backhaul to all the pico base stations.

One of the issues with heterogeneous networks is that small base stations, even if they are easier to deploy and operate than macro base stations, still cannot be deployed everywhere, since there are restrictions on where to place them. Furthermore, often the placement of small base stations or LPNs results in insufficient coverage for all of the users targeted to be served. Hence, even after the addition of small base stations around them, there still exists the possibility of users being in coverage holes of the macro layer, and as such they may not necessarily benefit from this addition of small base stations, relays, or low power nodes. This can happen due to an obstacle, such as a wall, or similar barrier being between the low power node and the user in the macro layer coverage hole.

Moreover, such a situation like the one described above might occur even in the case of significant obstacles between the LPNs and certain users. Due to the much higher power transmitted by the macro base stations, low power nodes do not always succeed in absorbing many users. For example, there might be cases such as the macro layer not providing good coverage to a certain area, and thus users in this area could still connect to the macro base station rather than to the low power node around.

One way to extend the coverage of macro base stations without adding a micro/pico layer is to deploy remote radio heads within the macro cell. Referring to FIG. 2, a remote radio head (RRH) 30 can be used to provide an intermediate node between a user equipment unit (UE) 40 and a base station 20, referred to in this context as a "donor", "serving" or "anchor" base station, as it is providing resources to the RRH 30. Communications between the RRH 30 and the UE 40 is performed using the Uu interface, which is the same interface that the UE 40 normally uses to communicate directly to the base station 20. Thus, from the standpoint of the UE 40, there is no difference in the protocol used when communicating with a relay node.

Communications between the RRH 30 and the donor base station 20, referred to as "backhaul" communications, are performed using the Un interface on both the uplink (RRH to base station) direction and the downlink (base station to RRH) direction.

SUMMARY

Embodiments of the present invention are directed to alleviating one or more problems of the prior art. In particular, some embodiments of the invention may enable more dense coverage within a macro cell while reducing interference that may be experienced by UEs within the macro cell, cell-edge UEs in neighboring macro cells and/or UEs served by pico cells within the macro cell.

Some embodiments provide methods of communicating with a selected user equipment terminal (UE) in a first cell served by a base station and a remote radio head. The methods include forming a list of non-targeted UEs including other UEs in the first cell and cell edge UEs in a neighboring cell that borders the first cell that are located near a border of the first cell and the neighboring cell, the list including geographic locations and signal to interference plus noise ratios (SINRs) of the non-targeted UEs, generating a list of candidate precoding matrices that can be used to communicate with the selected UE from the base station and/or from the remote radio head, generating a list of available precoding matrices by discarding from the list of candidate precoding matrices those precoding matrices that may cause interference to at least one non-targeted UE, selecting a precoding matrix from the list of available precoding matrices, and communicating with the selected UE using the selected precoding matrix.

Discarding precoding matrices from the list of candidate precoding matrices may include discarding from the list of candidate precoding matrices those precoding matrices that generate a beam that causes interference to least one non-targeted UE.

The methods may further include iteratively generating a list of available precoding matrices and selecting a precoding matrix from the list of available precoding matrices for each UE in the first cell.

Communicating with the selected UE using the selected precoding matrix may include communicating with the selected UE using the selected precoding matrix by the remote radio head.

The methods may further include discarding UEs from the list of non-targeted UEs that are served on a different frequency than a frequency on which the targeted UE is served before generating the list of available precoding matrices.

Local UEs in a central region within the first cell may be served using a first frequency and local UEs in a cell-edge region near a boundary of the first cell with the neighboring cell may served using a second frequency that is different from the first frequency. Cell edge UEs in the neighboring cell may be served using the first frequency or with a third frequency that is different from the second frequency and the first frequency.

The methods may further include generating a list of picocell UEs served by one or more picocells defined within the first cell, and combining the list of picocell UEs with the list of local UEs in the cell and the list of cell edge UEs to form the combined list of non-targeted UEs.

Each of the base station, the remote radio head and the targeted UE may include a plurality of antennas.

The methods may further include discarding UEs from the list of non-targeted UEs that are served on a different resource block than the selected UE.

Some embodiments provide a network node in a wireless communication network including a selected user equipment terminal (UE) in a first cell served by the base station and one or more remote radio heads. The base station includes a processor that communicates with a plurality of transceivers respective antennas. The processor is configured to form a list of non-targeted UEs including other UEs in the first cell and cell edge UEs in a neighboring cell that borders the first cell that are located near a border of the first cell and the neighboring cell, the list including geographic locations and signal to interference plus noise ratios (SINRs) of the non-targeted UEs. The processor is further configured to generate a list of candidate precoding matrices that can be used to communicate with the selected UE from the base station and/or from the remote radio head, to discard from the list of candidate precoding matrices those precoding matrices that are likely to cause interference to at least one non-targeted UE to generate a list of available precoding matrices, and to select a precoding matrix from the list of available precoding matrices for communicating with the selected UE.

The network node may include a base station, and the transceiver may be deployed within the base station.

The processor may be further configured to discard from the list of candidate precoding matrices those precoding matrices that generate a beam that covers at least one non-targeted UE.

The processor may be further configured to iteratively generate a list of available precoding matrices and select a precoding matrix from the list of available precoding matrices for each UE in the first cell.

The processor may be further configured to instruct the remote radio head to communicate with the selected UE using the selected precoding matrix.

The processor may be further configured to discard UEs from the list of non-targeted UEs that are served on a different frequency than a frequency on which the targeted UE is served before generating the list of available precoding matrices.

The processor may be further configured to generate a list of picocell UEs served by one or more picocells defined within the first cell, and combine the list of picocell UEs with the list of local UEs in the cell and the list of cell edge UEs to form the combined list of non-targeted UEs.

The processor may be further configured to discard UEs from the list of non-targeted UEs that are served on a different resource block than the selected UE.

Some embodiments provide a computer program product for communicating with a selected user equipment terminal (UE) in a first cell served by a base station and a remote radio head. The computer program product includes a tangible computer readable storage medium having computer readable program code embodied in the medium. The computer readable program code includes computer readable program code configured to form a list of non-targeted UEs including other UEs in the first cell and cell edge UEs in a neighboring cell that borders the first cell that are located near a border of the first cell and the neighboring cell, the list including geographic locations and signal to interference plus noise ratios (SINRs) of the non-targeted UEs, and computer readable program code configured to generate a list of candidate precoding matrices that can be used to communicate with the selected UE from the base station and/or from the remote radio head. The computer program product further includes computer readable program code configured to discard from the list of candidate precoding matrices those precoding matrices that may cause interference to at least one non-targeted UE to generate a list of available precoding matrices, computer readable program code configured to select a precoding matrix from the list of available precoding matrices, and computer readable program code configured to communicate with the selected UE using the selected precoding matrix.

Other aspects and features of the present invention will become apparent to those of ordinary skill in the art upon review of the following description of specific embodiments of the invention in conjunction with the accompanying figures.

BRIEF DESCRIPTION OF THE DRAWINGS

FIG. 10 is a network diagram that illustrates various scenarios that may be addressed according to the embodiments of FIG. 9.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The concept of heterogeneous networks (HetNet) has emerged in the context of Long Term Evolution (LTE) and LIE-Advanced. A heterogeneous network is a radio access network that includes layers of different-sized cells ranging from large (macro cells) to small (microcells, picocells and femtocells). In order to reach the full bandwidth capacity of either protocol, it is thought that operators will need to supplement their traditional large macrocells with many different-sized smaller cells.

Standards bodies, such as the Institute of Electrical and Electronics Engineers (IEEE) and 3rd Generation Partnership Project (3GPP), are currently in the process of defining various aspects of HetNet operation, including, for example, how the different-sized cells will work together, how hand-off among them will be achieved, and how interference among them will be minimized.

Typically a heterogeneous radio access network includes multiple macro and micro cells. Further, in some heterogeneous radio access networks the operation of the macro base stations for the macro cells and micro base stations for the micro cells may be coordinated, particularly in a Coordinated Multipoint (CoMP) system. In a CoMP architecture a collection of cells (e.g., the coordinated set of cells) may be connected to a central node that coordinates the transmission/reception of user signals to mitigate interference among the smaller sub-cells.

Figure 1:
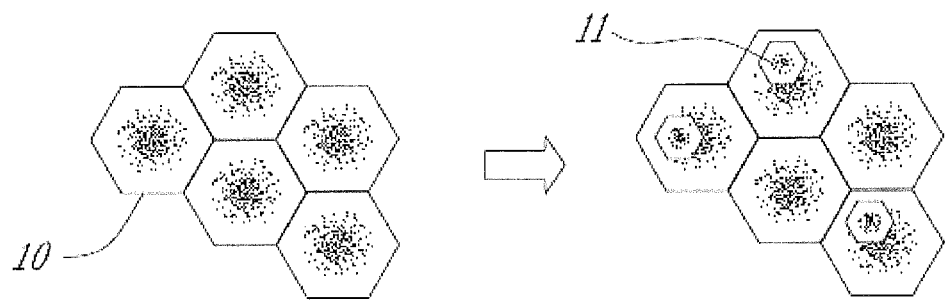
FIG. 1 is a schematic diagram illustrating a conventional heterogeneous network.
Figure 2:
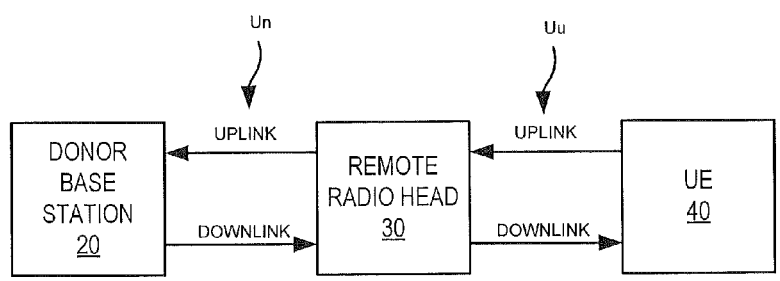
FIG. 2 is a schematic diagram illustrating backhaul and access links of a relay node in a conventional heterogeneous network.
Figure 3A:
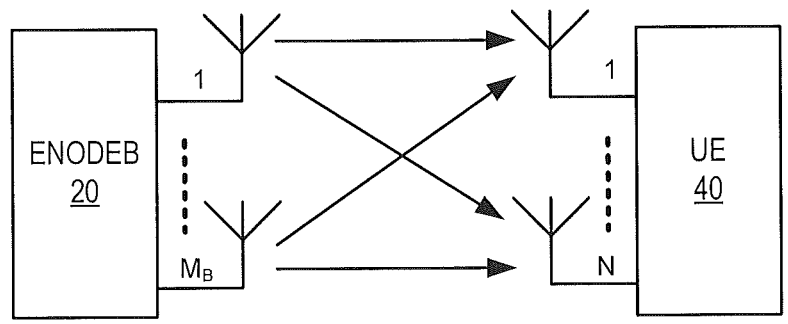
FIGS. 3A and 3B illustrate multiple input-multiple output communications between a base station and a user equipment and between a remote radio head and a user equipment in accordance with some embodiments.
Figure 3B:
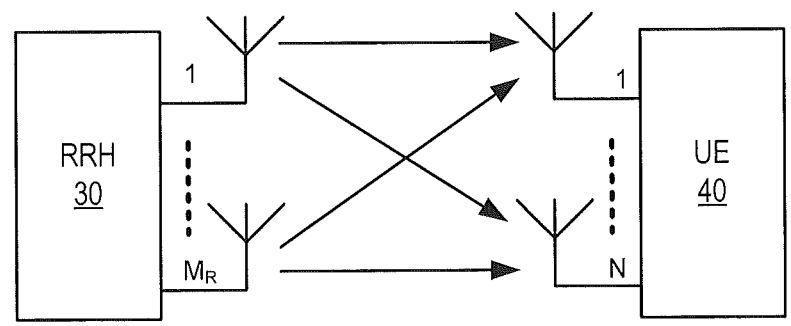

A multi-cell network is considered herein, where the macro base station in each cell is connected to a given number of remote radio heads (RRHs), which are distributed over the geographic area of the cell. Referring to FIG. 3A, a macro base station 20, which may be an eNodeB in LTE parlance, in each cell is equipped with a number ($M_B$) of antennas, where $M_B \geq 1$. The macro base station 20 may communicate with a UE 40, which also has a number (N) of antennas, where $N \geq 1$. Likewise, referring to FIG. 3B, an RRH 30 may communicate with a UE 40. The RRH 30 may have a number ($M_R$) of antennas, where $M_R \geq 1$.

Data throughput, or transmission capacity, can be increased through the use of multiple transmitters/receivers at one or both terminals. MIMO (for multiple input/multiple output) refers to the use of multiple transmitters/receivers at both terminals, such as a base station 20 and a UE 40, as illustrated in FIG. 3A. In MIMO, both transmitters can transmit independent data streams using the same transmission resources (in time and frequency). Using channel estimation techniques, each of the receivers can separate the data streams and demodulate the transmitted data.

For MIMO, at least two data streams (referred to in LTE as "layers") may be used. The number of layers used in a particular transmission is less than or equal to the number of antennas.

Precoding is a form of beamforming that supports multi-layer transmission in multi-antenna wireless communications. In point-to-point systems, precoding means that multiple data streams are emitted from the transmit antennas with independent and appropriate weightings that are selected so that the link throughput is maximized at the receiver output. Referring to FIG. 3A, when the macro base station 20 and the UE 40 each have multiple antennas, a precoding matrix is defined that includes weights for each transmit/receive antenna pair. Thus, the precoding matrix for communications between a macro base station 20 having $M_B$ antennas and a UE 40 having N antennas will have dimensions $M_B \times N$. Similarly, referring to FIG. 3B, the precoding matrix for communications between a remote radio head 30 having $M_R$ antennas and a UE 40 having N antennas will have dimensions $M_R \times N$.

The macro base station 20 is assumed to have knowledge of the locations of each of the RRHs 30 in its cell. The macro base station 20 may also retain control over the precoding matrices (or vectors) used by the RRHs in its cell.

A generalized system may include K number of RRHs in a cell, where $K \geq 1$. For simplicity, it may be assumed that each RRH is equipped with the same number of antennas, denoted by $M_R$, where $M_R \geq 1$. The user equipment (UEs) are assumed to have N antennas each, where $N \geq 1$, and can receive coordinated transmission (involving one or more layers) from multiple RRHs as well as the macro base station in their respective cells.

According to some embodiments of the inventive concept, the assignment of precoding matrices is coordinated with the selection of remote radio heads (RRHs) for transmission to selected UEs in a heterogeneous deployment to increase aggregate cell throughput while reducing interference to neighboring cells.

In some embodiments, the assignment of precoding matrices and the selection of RRHs may be coordinated with fractional frequency reuse (FFR) in the macro network to further mitigate interference between neighboring cells.

In further embodiments, these approaches may be extended to networks that include picocell overlays of the macro network. In that case, the macro base station may coordinate with the picocells to mitigate additional interference.

In particular embodiments, each macro base station 20 may have knowledge of the location of the UEs 40 in its own cell, as well as the locations of the UEs 40 in neighboring cells that are located near the cell boundary, and in some embodiments the locations of UEs 40 in picocells within the macro cell.

The identities of cell-edge UEs 40 in neighboring cells can be determined using an appropriate metric, such as one based on signal to interference plus noise ratio (SINR).

In general, UEs are able to estimate their locations using global positioning system (GPS) technology in the case of 4G (and beyond) UEs, and 3GPP-standardized positioning reference signals (PRS) in the case of pre-4G UEs. This information is fed back by the UE to its serving base station. The serving base station may share the locations of its cell-edge UEs with its neighboring base stations. For the purposes of the present inventive concepts, the location information need not be highly accurate; a coarse quantization may be sufficient. Additionally, the frequency of location-related signaling between neighboring base stations need not be very high, because the interval between significant changes in UE location may be much larger than the duration of a radio frame.

Embodiment 1

Precoding Matrix and RRH Selection

Embodiments of the invention that utilize coordinated precoding matrix and RRH selection are illustrated in FIG. 4. In these embodiments, two distinct sets of precoding matrices are considered. The first set contains matrices of size $M_B \times L$, where L is the number of transmission layers used for communication with a UE. The rows of these matrices correspond to the transmit antennas of the macro base station 20. The second set contains matrices of size $M_R \times L$, the rows of which correspond to the antennas of each RRH 30. Both sets also contain the appropriately sized all-zero matrices, which corresponds to the scenario where the macro base station or the RRH is not transmitting to a given UE. The distinction between the matrices in the two sets is (1) the difference between the number of antennas at the macro base station ($M_B$) and the number of antennas at each RRH ($M_R$), and (2) the fact that the directional transmission of the macro base station 20 is restricted such that the beam that is formed points within the coverage area of the cell, whereas the beam formed by each RRH 30 has no such restrictions.

The precoding matrices that are used for transmission to the UEs in each cell are of the size $(M_B + KM_R) \times L$, and are comprised of candidate matrices from each of the two sets described above. Iterating through all combinations of the matrices in the two sets to form different precoding matrices yields the transmission codebook used in each of the cells. Noting that a subset of the precoding matrices contain all-zero sub-matrices, the codebook addresses the scenario in which only a subset of the available RRHs 30 transmit to a particular UE (i.e., selective transmission).

Similarly, the scenario in which the antennas of the macro base station 20 are not used for transmission to a particular UE is also covered by the matrices in the codebook.

In these embodiments, an appropriate selection of precoding matrices is made to mitigate both intra-cell and inter-cell interference. In particular, a precoding matrix is selected such that the transmission to the intended UE is spatially uncorrelated with respect to the channels of other UEs in the same cell that are chosen to be served in the same resource block (RB), i.e. that use the same time/frequency resources. In addition, the precoding matrix is selected such that the transmission to the intended UE is spatially uncorrelated with respect to the channels of cell-edge UEs in neighboring cells. This is facilitated by the knowledge of the location of the UEs and RRHs 30, which is available at the serving macro base station 20.

To determine if a particular UE is in the beam formed by the precoding matrix, each beam has a unique reference signal (RS) that is broadcast. The UE measures its SINR with respect to each of these RSs and feed this information back to the base station. The base station can then determine if a particular UE is in the beam formed by the precoding matrix based on whether the SINR value is above a pre-defined threshold.

According to these embodiments, at the time a particular UE 40 is scheduled for transmission, the macro base station 20 iterates through the available precoding matrices. For each precoding matrix, the macro base station 20 may utilize the latest available locations of the UE 40 and RRH 30 to determine if any UE other than the intended receiver is in the immediate path of the beam(s) that will be formed using the matrix in question. If this is the case, that matrix may be discarded from consideration. At the end of the iteration, a precoding matrix from the remaining subset is chosen using an appropriate set of criteria. The chosen precoding matrix is used to serve the UE 40 until a newer set of UE locations is available. This process may be repeated routinely at pre-defined intervals and/or via an interrupt-driven approach.

Figure 4A:
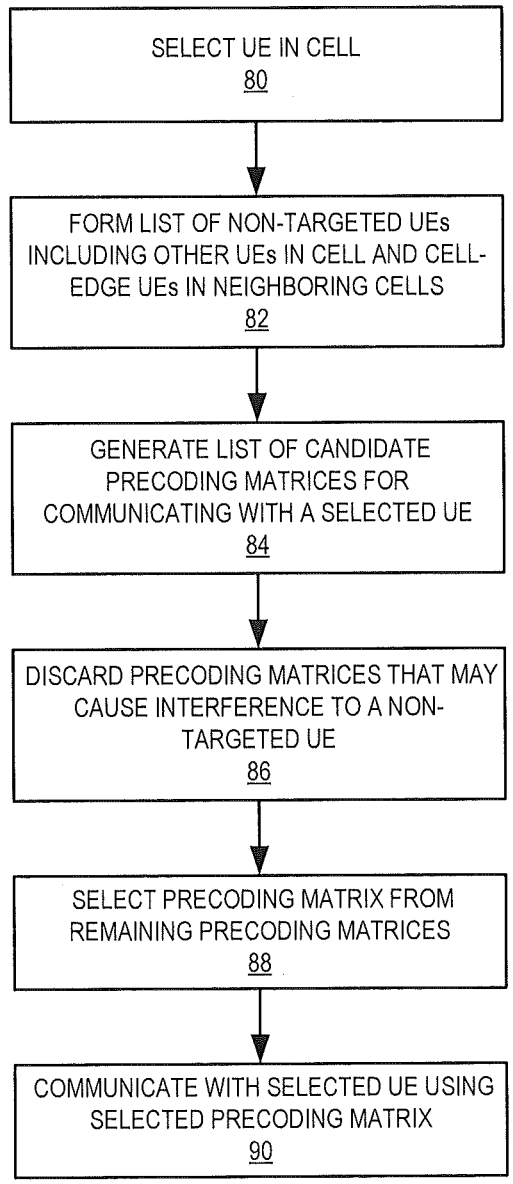
FIG. 4A is a flowchart that illustrates operations according to embodiments of the invention.

Operations according to some embodiments are illustrated in FIG. 4A. As noted above, the operations identify a precoding matrix for use with communications with a UE in a cell that may reduce or minimize the impact on other UEs in the cell and cell-edge UEs in neighboring cell. To do so, a UE in the cell is selected for consideration (block 80). The operations include forming a list of non-targeted UEs, which includes other UEs in the cell and cell-edge UEs in the neighboring cells (block 82). Geographic locations and signal to interference plus noise ratios (SINRs) of the non-targeted UEs are also obtained.

Accordingly, a combined list of other UEs in the cell and cell edge UEs in the neighboring cell is compiled to provide a combined list of non-targeted UEs.

The operations then generate a list of candidate precoding matrices that can be used to communicate with the selected UE from the base station and/or from one or more remote radio heads in the cell (block 84). A list of available precoding matrices is then generated by discarding from the list of candidate precoding matrices those precoding matrices that may cause interference to at least one non-targeted UE (block 86). A precoding matrix is then selected from the list of available precoding matrices (block 88), and the selected precoding matrix is then used for communicating with the selected UE (block 90).

Figure 4B:
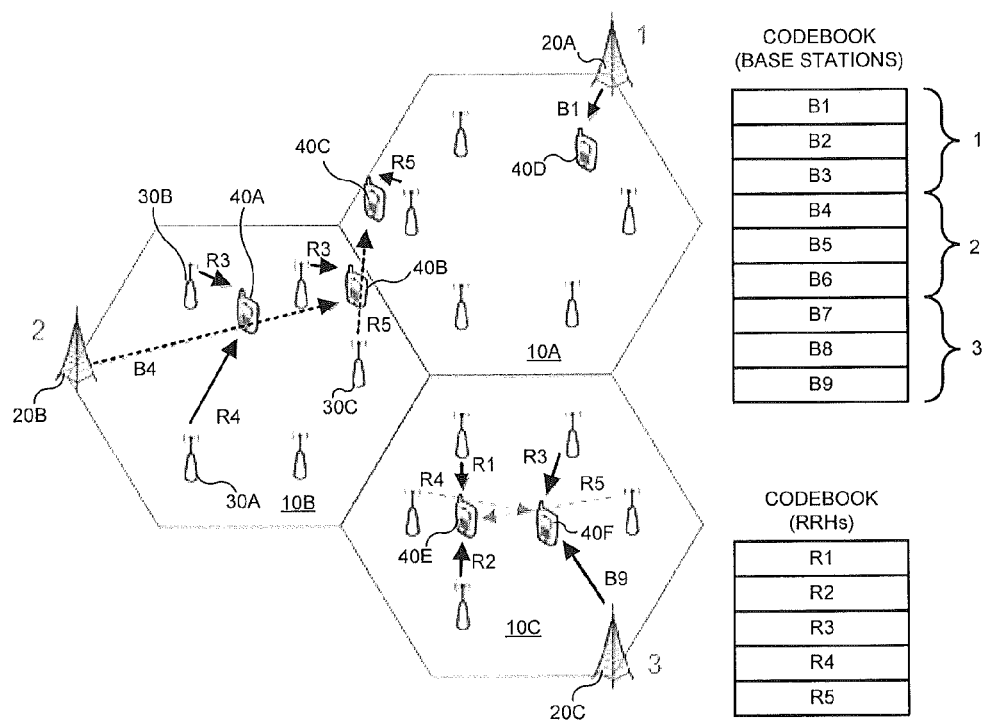
FIG. 4B is a network diagram that illustrates various scenarios that may be addressed according to some embodiments of the inventive concepts.

FIG. 4B illustrates a collection of cells 10A, 10B, 10C that are served by respective macro base stations 20A, 20B, 20C, and in which a plurality of RRHs 30 are deployed. A plurality of UEs 40A to 40F operate in the cells. The base station codebooks include precoding matrices B1-B3 utilized by base station 20A, precoding matrices B4-B6 utilized by base station 20B, and precoding matrices B7-B9 utilized by base station 20C. The RRH codebooks include precoding matrices R1-R5.

As shown in FIG. 4B, in cell 10A, the macro base station 20A may communicate with UE 40D using precoding matrix B1, while precoding matrix R5 may be used by an RRH in cell 10A to communicate with UE 40C.

In cell 10B, precoding matrix R3 may be used by RRH 30B or precoding matrix R4 may be used by RRH 30A to communicate with UE 40A. However, precoding matrix B4 may not be available for communications with UE 40A from the base station 20B, because the UE 40B in cell 10B may be in the path of the beam formed by precoding matrix B4. Similarly, the precoding matrix R5 may not be usable by RRH 30C to communicate with UE 40B, because the UE 40C in cell 10A may be in the path of the beam formed by precoding matrix R5. Further, in cell 10C, precoding matrices B9, R1, R2 and R3 may be available for the illustrated UEs, while precoding matrices R4 and R5 may be unavailable for the illustrated UEs.

Figure 5:
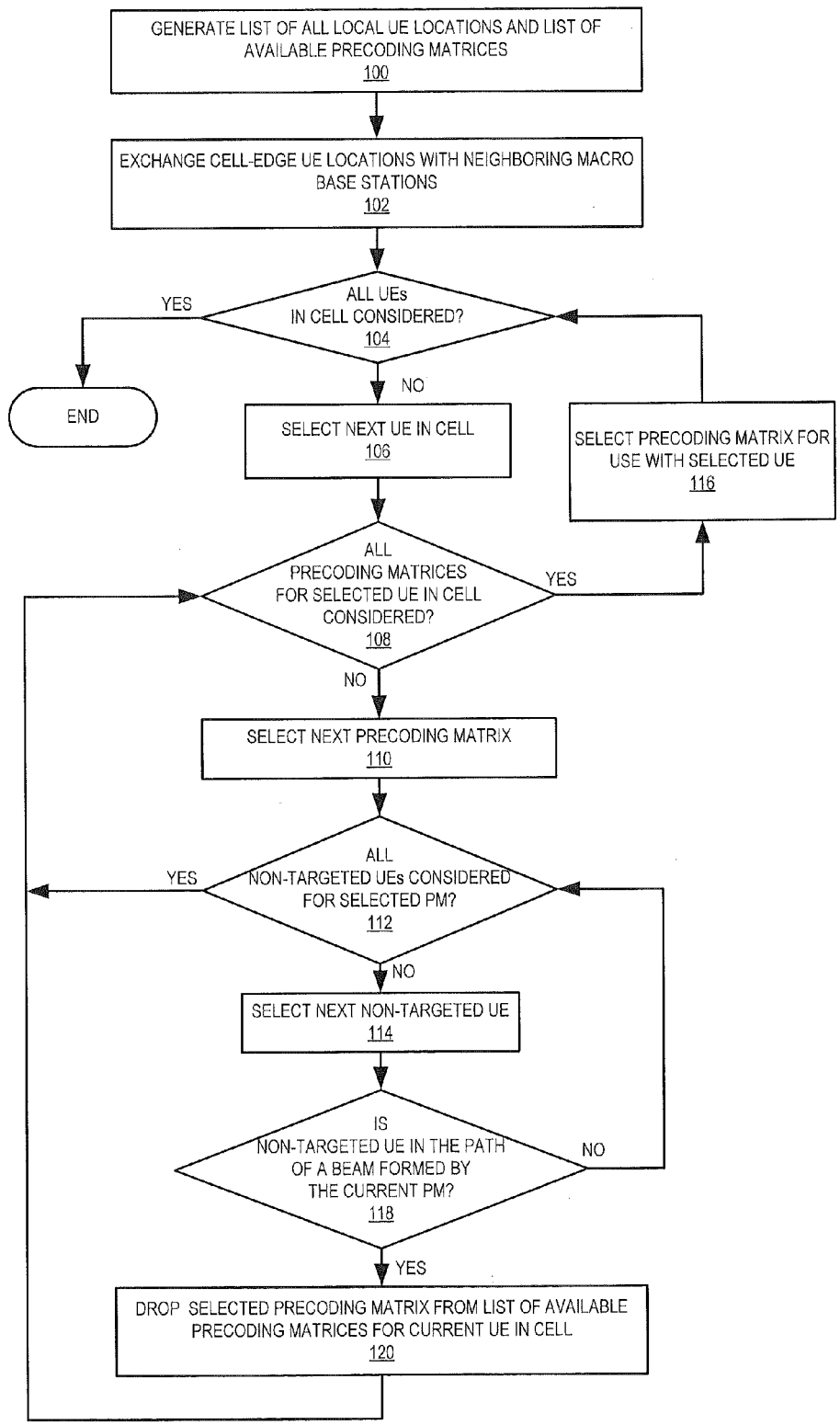
FIG. 5 is a flowchart that illustrates operations according to the first embodiment in greater detail.

Operations according to these embodiments are illustrated in more detail in the flowchart of FIG. 5. Referring to FIG. 5, at a given macro base station 20, a list of all UE locations in the cell 10 served by the base station 20 is generated or otherwise obtained along with a list of all available precoding matrices (block 100). Values of signal to interference plus noise ratios (SINRs) may also be obtained for each UE in the cell.

The macro base station 20 also obtains information about the locations and SINRs of cell-edge UEs in neighboring cells by exchanging UE location information with the base stations 20 that serve the neighboring cells (block 102).

The macro base station 20 then selects a precoding matrix for each UE in the cell. The macro base station may check to see if all UEs in the cell have been considered and precoding matrices selected for each UE in the cell (block 104). Once precoding matrices have been selected for each UE in the cell, the process ends, and the precoding matrices are used for transmission to the UEs served by the base station. If all UEs have not been considered, the macro base station 20 selects the next UE in the cell (block 106) and then determines if all precoding matrices for the selected UE have been considered (block 108). If all precoding matrices applicable to the selected UE have been considered, a precoding matrix is selected from the group of candidate precoding matrices for use with the selected UE (block 116), and operations return to block 104 to determine if all UEs in the cell have been considered.

If the operations determine at block 108 that all precoding matrices for use with the selected UE have not yet been considered, the operations select the next precoding matrix from the list of available precoding matrices (block 110). The operations then determine if all non-targeted UEs have been considered for the selected precoding matrix (block 112). In this context, "non-targeted UE" refers to all UEs in the cell served by the macro base station 20 other than the selected UE that is being considered, along with all cell-edge UEs in neighboring cells.

If all non-targeted UEs have not yet been considered, the operations select the next non-targeted UE (block 114) and determine if the selected non-targeted UE is subject to interference from the selected precoding matrix, for example if the non-targeted UE in question is in the path of a beam formed to the selected UE by the selected precoding matrix (block 118). If the non-targeted UE is in the path of the beam formed by the selected precoding matrix, the selected precoding matrix is dropped from the list of candidate precoding matrices that are available to be used for communications with the selected UE (block 120). Otherwise, operations return to block 112 to determine if any other non-targeted UEs remain for consideration.

Figure 6:
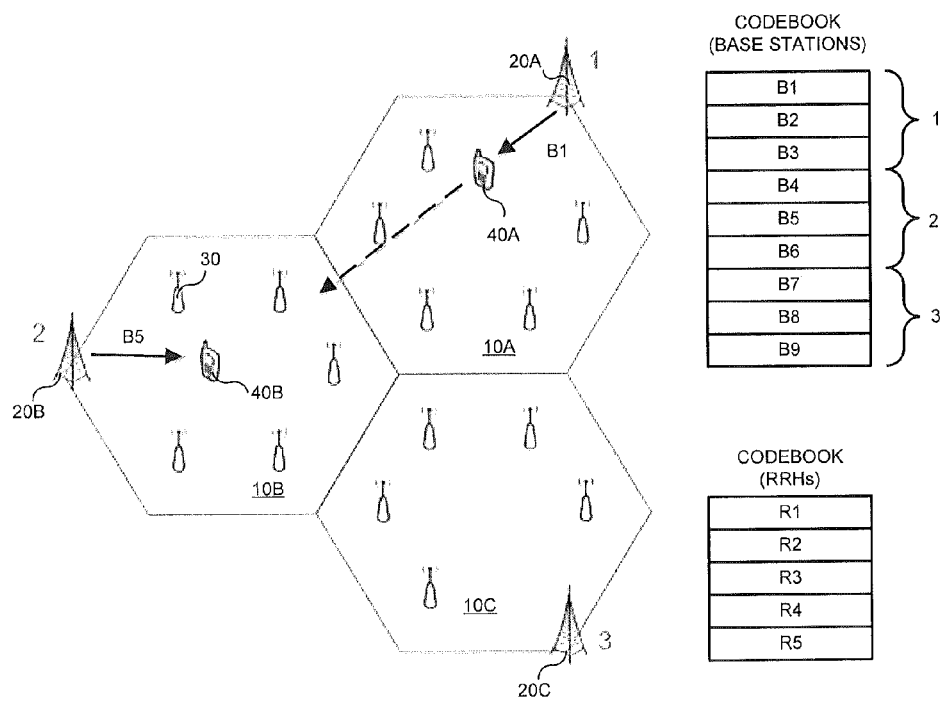
FIGS. 6-8 are network diagrams that illustrate various scenarios that may be addressed according to the embodiments of FIG. 5.
Figure 7:
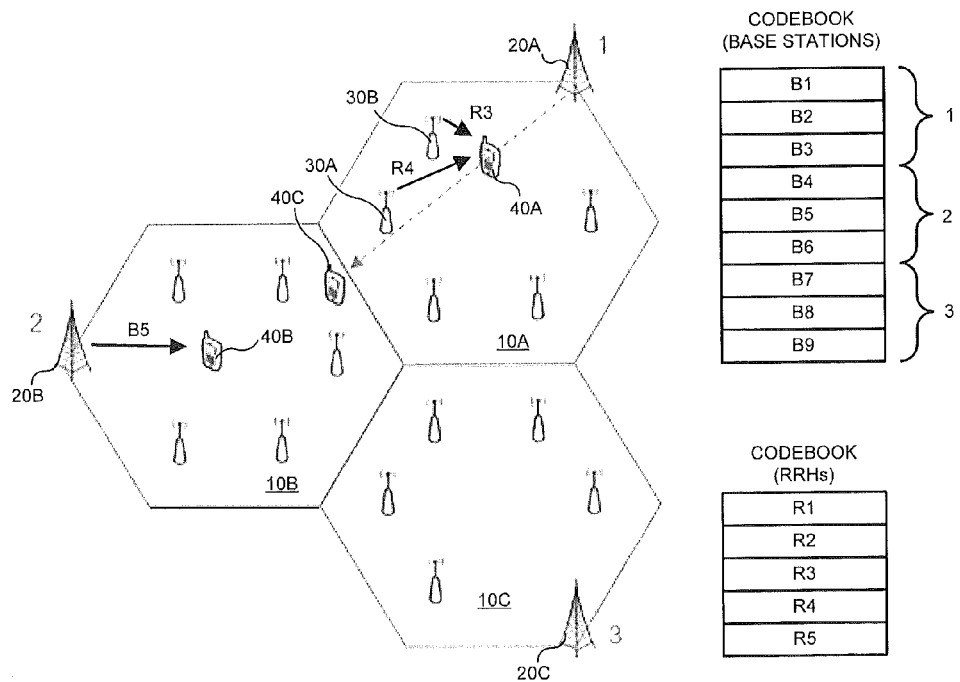
Figure 8:
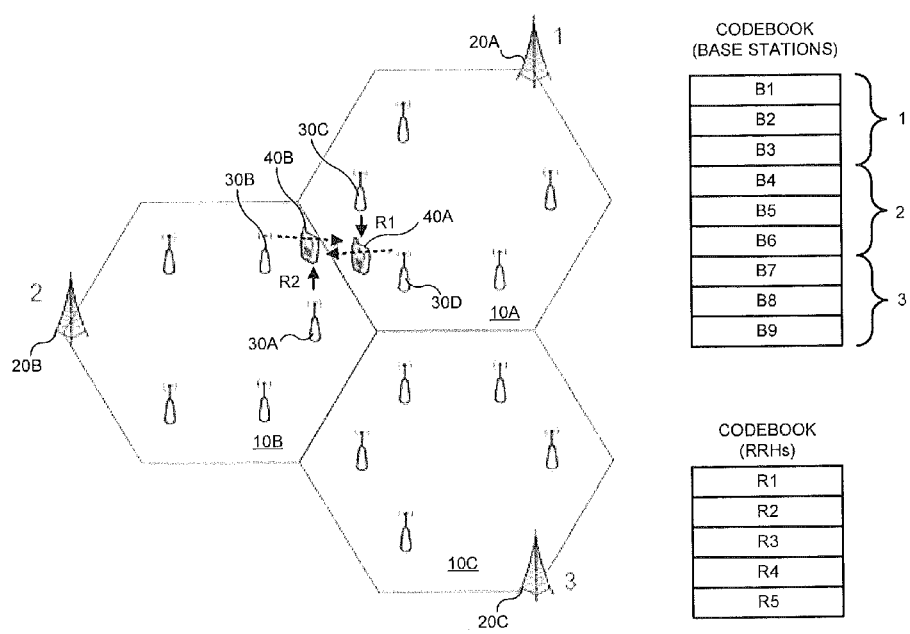

Further examples are illustrated in FIGS. 6-8.

Referring to FIG. 6, a scenario is illustrated in which two cell-interior UEs 40A, 40B are to be served over the same resource block (RB) by base stations 20A, 20B in one of two adjacent cells 10A, 10B. Since both UEs 40A, 40B are relatively isolated from the transmission in the neighboring cells (assuming reasonable transmit power levels), the macro base station 20A, 20B in each cell could be used to serve its respective UE. In practice, one or more RRHs 30 could also be chosen to transmit to these UEs in addition to the base station. Using a selected precoding matrix, the macro base station 20A in cell 10A would form a beam in the direction of the intended UE 40A. The power from this directional transmission would potentially propagate into the neighboring cell 10B. However, this would be acceptable if only a cell-interior UE is being served in the neighboring cell 10B as illustrated in FIG. 6.

FIG. 7 illustrates a scenario similar to that illustrated in FIG. 6, except that there is a cell-edge UE 40C in the neighboring cell 10B (or in the same cell 10A) that is in the path of the directional beam formed by the macro base station 20A towards the UE 40A. In this case, an alternate precoding matrix can be selected such that either a different beam is formed from the macro base station 20A to serve the desired UE 40A without affecting the performance of the cell-edge UE 40C, or the antennas of the macro base station 20A are not selected for transmission altogether. In the latter case, one or more RRHs 30A, 30B may be chosen to serve the UE 40A by forming a beam that is spatially uncorrelated with the cell-edge UE 40C using, for example, precoding matrix R3 or R4 as illustrated in FIG. 7. A distributed placement of the RRHs 30 over the cell area may be particularly useful in this scenario as it may potentially provide a variety of candidate precoding matrices that can be selected.

FIG. 8 illustrates a scenario in which a cell-edge UE 40A, 40B is to be served in each of two neighboring cells 10A, 10B. In addition, these two cell-edge UEs 40A, 40B are located relatively closely to each other. In such a scenario, it may be unlikely that a precoding matrix would be selected in either cell that involves transmission from the respective macro base stations 20A, 20B. Instead, one or more RRHs 30 would be suitably chosen to serve the UE 40A, 40B in the respective cell. The individual precoding matrices of these RRHs (which are sub-matrices of the overall precoding matrix described above) may be selected such that the beams formed by these RRHs 30 may not substantially impact the cell-edge UE 40A, 40B in the neighboring cell. If this is not possible for a given RRH, then a different RRH may be selected instead.

For example, as illustrated in FIG. 8, precoding matrix R1 may be selected for transmission by RRH 30C to UE 40A, and precoding matrix R2 may be selected for transmission by RRH 30A to UE 40B. Precoding matrices for transmission by RRHs 30B and 30D may be rejected from consideration based on the arrangement of the UEs 40A, 40B.

Embodiment 2

Precoding Vector and RRH Selection Coordinated with Fractional Frequency Reuse (FFR)

In some embodiments, the precoding matrix selection and assignment operations described above may be coupled with a Fractional Frequency Reuse (FFR) scheme in the macro network. Such a coupling is motivated by the fact that there may be instances in which the number of spatial degrees of freedom provided by the techniques described above may be insufficient. In other words, there may be no suitable precoding matrix available in the codebook that sufficiently mitigates interference impacting cell-edge UEs in neighboring cells or other UEs in the same cell. In such a scenario, it may be desirable to compromise on the goal to mitigate interference and select a precoding matrix belonging to the codebook. Alternatively, a decision could be made to not serve the intended UE altogether. Unfortunately, neither of these solutions is likely to be beneficial in terms of cell-edge and aggregate throughputs.

In scenarios such as these, the macro base stations can coordinate the frequency utilized for cell-edge communication in their respective cells. In particular, the RRHs that are chosen to transmit to cell-edge UEs in each cell can be instructed to transmit on a frequency that is orthogonal to or otherwise distinct from the frequency used by their counterparts in neighboring cells to transmit to cell-edge UEs. This approach may partially alleviate the restrictions on the precoding matrices that can be selected for transmission.

For example, consider the scenario illustrated in FIG. 7. In that case, a precoding matrix need not be discarded from consideration if the corresponding beam points in the direction of the cell-edge UE 40C. This is because the cell-edge UE 40C will be served using a different frequency than the UE 40A in the interior of cell 10A.

In another example, consider the scenario in Example 8. Using FFR coordination, from the standpoint of the base station 10A, the precoding matrices that correspond to beams that point in the direction of the cell-edge UE 40B in the neighboring cell 10B would no longer need to be rejected from consideration since the UE 40B will be served using a different frequency than the UE 40A in the cell 10A. Furthermore, as in the case of conventional FFR, a pre-determined set of frequencies can be reused by the macro base station and RRHs transmitting to cell-interior UEs in any of the cells.

Figure 9:
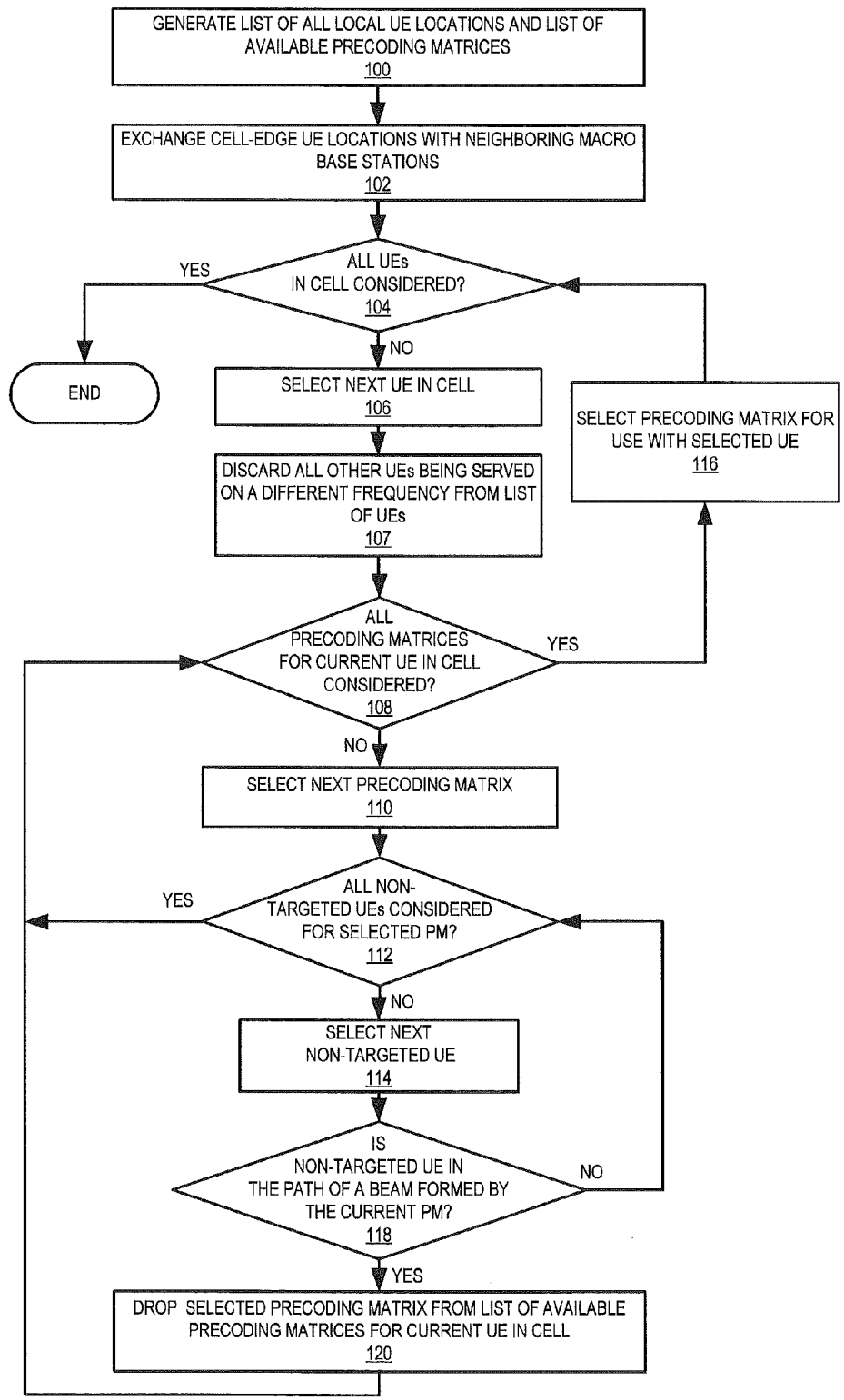
FIG. 9 is a flowchart that illustrates operations according to a second embodiment.

The additional component contributed by this embodiment to the algorithm from the first embodiment is highlighted in the flowchart in FIG. 9, which is similar to the flowchart of FIG. 5, except that a new block 107 is added. Each time a new UE is selected for consideration (block 106), all UEs that are being served on different frequencies are dropped from the list of UEs that must be considered in the process of selecting a precoding matrix for use with the selected UE.

An example of this embodiment is illustrated in FIG. 10. As shown therein, each base station 20A, 20B, 20C may use a first frequency, or frequency range/band, for transmissions to UEs located within the interior of their respective cells 10A, 10B, 10C. For cell-edge UEs, however, each base station 20A, 20B, 20C may use a different frequency. For example, base station 20A may use a second frequency or frequency range/band F2 for transmission to UEs located near the edge of cell 10A, base station 20B may use a third frequency or frequency range/band F3 for transmission to UEs located near the edge of cell 10B, and base station 20C may use a fourth frequency or frequency range/band F4 for transmission to UEs located near the edge of cell 10C.

Embodiment 3

Extension to Include Picocell Overlays

In the third embodiment of the inventive concepts, the system model described above may be extended to include picocells that are overlaid on the macro network. It is important to note that due to the relatively small geographic coverage area of a picocell, the extended technique utilized in this embodiment may be more sensitive to inaccuracies in the UE location information than the previous embodiments. As a result, to maintain the effectiveness of the technique, it may be desirable to increase the frequency of UE location information exchange between a pico base station and macro base station, and also between neighboring macro base stations.

In order to coordinate the transmission of its own antennas and RRHs with a pico base station, the macro base station may routinely request knowledge of the location of the UEs that are being served by the pico base station. Then, during the precoding matrix selection process for a particular UE in the macro network, the subset of the UEs that are being served using the same frequency in the pico network would be appended to the existing set of macro-network UEs to whom interference is to be mitigated. The rest of the algorithm from the previous embodiments is unchanged.

Note that if any of the pico network UEs satisfy the cell-edge criteria with respect the macro network, the corresponding macro base station may share its location with its neighboring counterparts, in addition to the locations of its own macro network cell-edge UEs.

Figure 11:
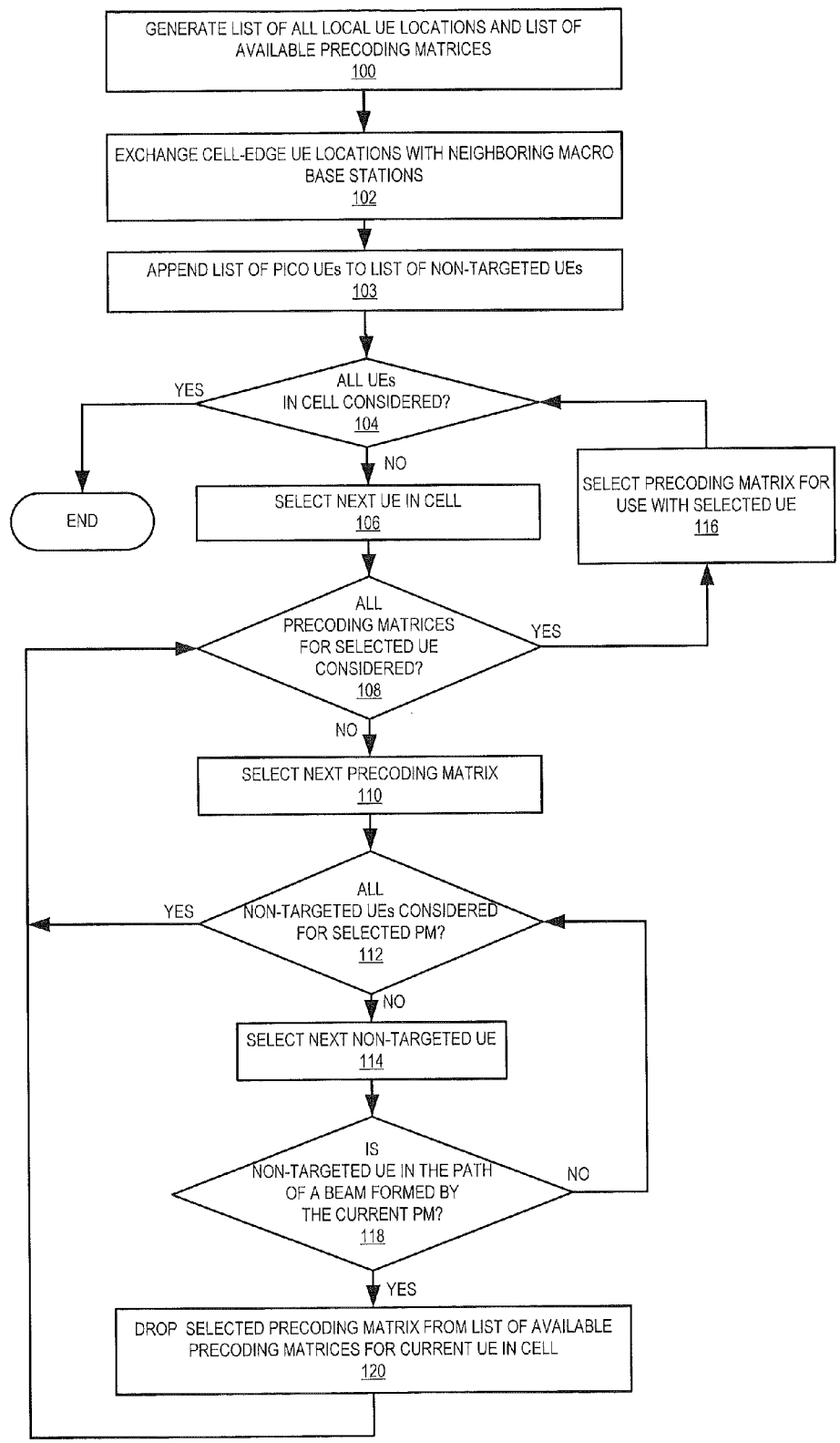
FIG. 11 is a flowchart that illustrates operations according to further embodiments.

This embodiment is illustrated in the flowchart of FIG. 11, which is similar to the flowchart of FIG. 5 except that a new block 103 is added. In block 103, a list of UEs served by picocells within the macro cell is obtained and appended to the list of target UEs that are considered in the selection of precoding matrices to be used for transmissions to UEs within the macro cell. Thus, UEs located within picocells are considered in a similar manner as cell-edge UEs in adjacent cells for purposes of selecting precoding matrices.

This embodiment can also incorporate coupling of the precoding assignment with Fractional Frequency Reuse (FFR) to increase potential orthogonal assignments as is described in connection with FIGS. 9-10. The FFR assignment for a picocell can be chosen, for example, to be the same as the cell-interior FFR assignment if the picocell is overlaid in the cell-edge area, or to be the same as the cell edge FFR assignment if the pico is overlaid in the cell-interior region.

Figure 12:
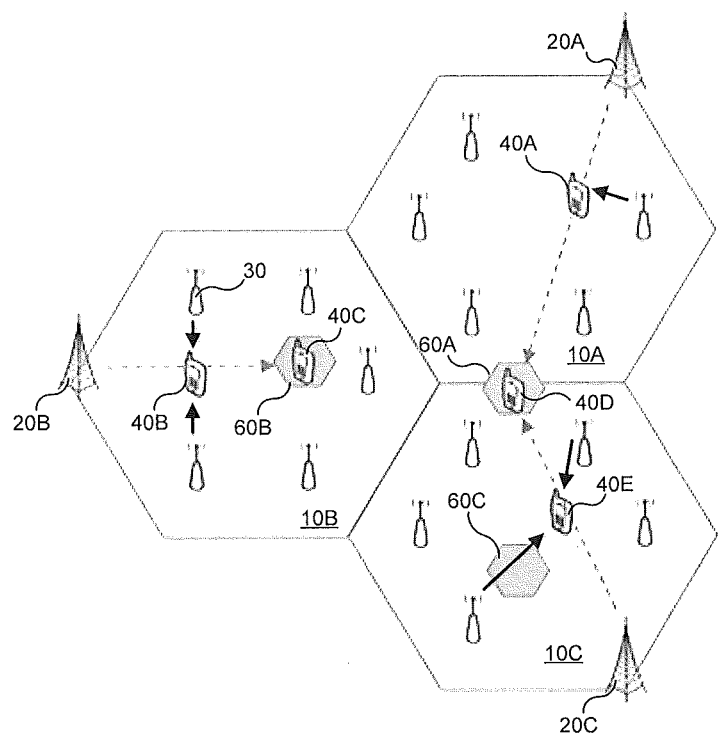
FIG. 12 is a network diagram that illustrates various scenarios that may be addressed according to the embodiments of FIG. 11.

Accordingly, referring to FIG. 12, picocells 60A, 60B and 60C are defined within macro cells 10A, 10B and 10C. A UE 40D is active in picocell 60A (which straddles the boundary between macro cell 10A and macro cell 10C), and a UE 40C is active in picocell 60B in macro cell 10A. When the base station 20A chooses a precoding matrix for transmissions to UE 40A in cell 10A, the base station 20A will append a list of UEs in picocells that overlap cell 10A to the list of target UEs that are considered for interference purposes. Thus, a precoding matrix for transmissions to UE 40A may be removed from consideration if it would result in unacceptable interference to UE 40D in the pico cell 60A. Similarly, when the base station 20B chooses a precoding matrix for transmissions to UE 40B in cell 10B, the base station 20B will append a list of UEs in picocells that overlap cell 10B to the list of target UEs that are considered for interference purposes. Thus, a precoding matrix for transmissions to UE 40B may be removed from consideration if it would result in unacceptable interference to UE 40C in the pico cell 60B.

Figure 13:
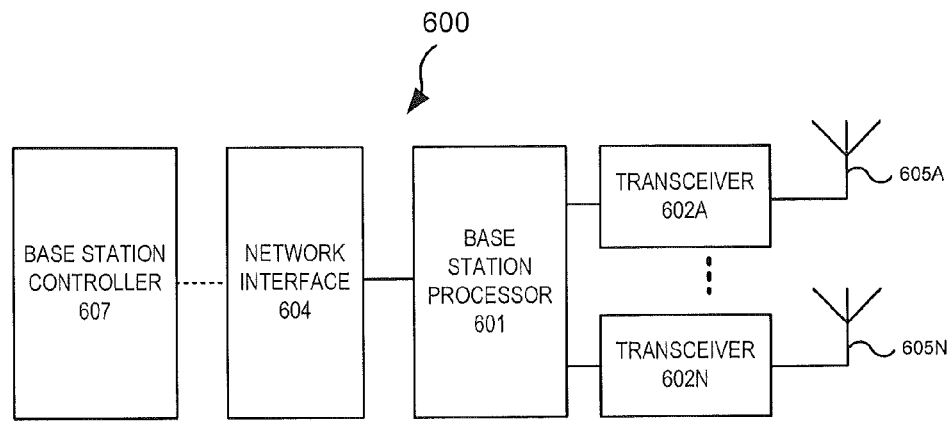
FIG. 13 is a block diagram of a base station according to some embodiments.

A block diagram of an embodiment of a base station 600 is shown in FIG. 13. The base station 600 typically includes a base station processor 601 coupled to a plurality of transceivers 602A-602N, and network interface 604. Each transceiver 602A-602N is coupled to a respective antenna 605A-605N. The base station processor 601 will typically perform the above described methods and algorithms for a predetermined macro cell. A base station controller 607 will interact with one or more base stations 600 when there is a need to control the overall operation of the network. The base station processor 601 would typically have the necessary functionality and procedures for processing between the media access control and physical layers of both transmission and reception signals. Similarly, the base station controller 607 in conjunction with the base station 600 is used to provide the necessary beam forming techniques described herein.

Figure 14:
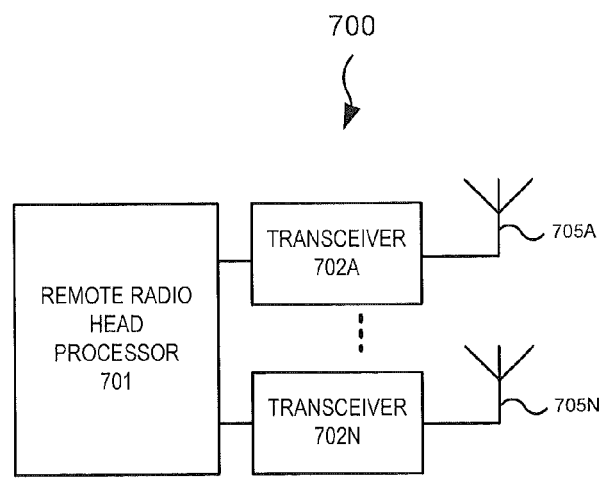
FIG. 14 is a block diagram of a remote radio head according to some embodiments.

A block diagram of an embodiment of a remote radio head 700 is shown in FIG. 14. The remote radio head 700 typically includes a relay node processor 701 coupled to a plurality of transceivers 702A-702N, each of which includes a respective antenna 705A-705N. The remote radio headprocessor 701 will typically perform the above described methods and algorithms for a predetermined microcell. The remote radio headprocessor 701 includes the necessary functionality and procedures for processing between the media access control and physical layers of both transmission and reception signals. The remote radio headprocessor 701 is also configured to provide the necessary beam forming techniques described herein.

Some embodiments of the inventive concepts described herein may enable high cell-edge data rates to be realized by combining existing deployments with selective scheduling of RRHs and assignment of precoding matrices and fractional frequency reuse. In the case of networks including picocell overlays of the macro network, some embodiments may also help mitigate additional interference through coordination with the pico base stations.

With reference to the present invention, it should be understood that in the illustrated embodiments, the micro/pico cells and micro/pico base stations and their respective locations within or near the macro cell are not limiting, since a macro cell could encompass one or more than the illustrated micro/pico cells and such micro/pico cells may be diversely and non-uniformly arranged from one macro cell to another, depending upon geographic utilization and traffic need and conditions.

As used herein, the terminology "micro base station" is to be understood as broadly encompassing any type of station which operates over a radio or air interface on both downlink (DL) and uplink (UL) and has extent of transmission that is lesser than (e.g., in geographic range or power) or subordinate to (e.g., delegated from/by) a macro base station. In corresponding fashion the terminology "micro cell" refers to any cellular territory or coverage area served by such broadly defined micro base station. Examples of types of cells and base stations encompassed by the terminology "micro cell" and "micro base station" also include pico cells and pico base stations, femto cells (which can exist in a femto cluster) and femto base stations, and relay base stations. Small base stations mainly means base stations transmitting with lower power and with fewer processing/hardware capacities than the normal macro base stations.

It will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of communicating with a selected user equipment terminal (UE) in a first cell served by a base station and a remote radio head, the method comprising:
    forming a list of non-targeted UEs including other UEs in the first cell, and cell edge UEs in a neighboring cell that borders the first cell that are located near a border of the first cell and the neighboring cell, the list including geographic locations and signal to interference plus noise ratios (SINRs) of the non-targeted UEs;
    generating a list of candidate precoding matrices that can be used to communicate with the selected UE from the base station and/or from the remote radio head;
    generating a list of available preceding matrices by discarding from the list of candidate preceding matrices those preceding matrices that may cause interference to at least one non-targeted UE;
    selecting a preceding matrix from the list of available preceding matrices; and
    communicating with the selected UE using the selected preceding matrix.

2. The method of claim 1, wherein discarding preceding matrices from the list of candidate preceding matrices comprises discarding from the list of candidate preceding matrices those preceding matrices that generate a beam that causes interference to at least one non-targeted UE.

3. The method of claim 1, further comprising iteratively generating a list of available preceding matrices and selecting a preceding matrix from the list of available preceding matrices for each UE in the first cell.

4. The method of claim 1, wherein communicating with the selected UE using the selected precoding matrix comprises communicating with the selected UE using the selected precoding matrix by the remote radio head.

5. The method of claim 1, further comprising discarding UEs from the list of non-targeted UEs that are served on a different frequency than a frequency on which the targeted UE is served before generating the list of available preceding matrices.

6. The method of claim 5, wherein local UEs in a central region within the first cell are served using a first frequency and where local UEs in a cell-edge region near a boundary of the first cell with the neighboring cell are served using a second frequency that is different from the first frequency.

7. The method of claim 6, wherein cell edge UEs in the neighboring cell are served using a third frequency that is different from the second frequency and the first frequency.

8. The method of claim 1, further comprising generating a list of picocell UEs served by one or more picocells defined within the first cell, and combining the list of picocell UEs with the list of local UEs in the cell and the list, of cell edge UEs to form the combined list of non-targeted UEs.

9. The method of claim 1, wherein each of the base station, each of the remote radio head and the targeted UE includes a plurality of antennas.

10. The method of claim 1, further comprising discarding UEs from the list of non-targeted UEs that are served on a different resource block than the selected UE.

11. A network node in a wireless communication network including a selected user equipment terminal (UE) in a first cell served by the base station and one or more remote radio heads, comprising:
    a processor coupled to a plurality of transceivers having respective antennas, wherein the processor is configured to form a list of non-targeted UEs including other UEs in the first cell and cell edge UEs in a neighboring cell that borders the first cell that are located near a border of the first cell and the neighboring cell, the list including geographic locations and signal to interference plus noise ratios (SINRs) of the non-targeted UEs;
    wherein the processor is further configured to generate a list of candidate precoding matrices that can be used to communicate with the selected UE from the base station and/or from the remote radio head, to discard from the list of candidate precoding matrices those precoding matrices that are likely to cause interference to at least one non-targeted UE to generate a list of available precoding matrices, and to select a precoding matrix from the list of available preceding matrices for communicating with the selected UE.

12. The network node of claim 11, wherein the processor is further configured to discard from the list of candidate precoding matrices those preceding matrices that generate a beam that covers at least one non-targeted UE.

13. The network node of claim 11, wherein the processor is further configured to iteratively generate a list of available precoding matrices and select a preceding matrix from the list of available precoding matrices for each UE in the first cell.

14. The network node of claim 11, wherein the processor is further configured to instruct the remote radio head to communicate with the selected UE using the selected preceding matrix.

15. The network node of claim 11, wherein the processor is further configured to discard UEs from the list of non-targeted UEs that are served on a different frequency than a frequency on which the targeted UE is served before generating the list of available precoding matrices.

16. The network node of claim 15, wherein local UEs in a central region within the first cell are served using a first frequency and where local UEs in a cell-edge region near a boundary of the first cell with the neighboring cell are served using a second frequency that is different from the first frequency.

17. The network node of claim 16, wherein cell edge UEs in the neighboring cell are served using a third frequency that is different from the second frequency and the first frequency.

18. The network node of claim 11, wherein the processor is further configured to generate a list of picocell UEs served by one or more picocells defined within the first cell, and combine the list of picocell UEs with the list of local UEs in the cell and the list of cell edge UEs to form the combined list of non-targeted UEs.

19. The network node of claim 11, wherein the processor is further configured to discard UEs from the list of non-targeted UEs that are served on a different resource block than the selected UE.

20. A non-transitory computer program product for communicating with a selected user equipment terminal (UE) in a first cell served by a base station and a remote radio head, the computer program product comprising:
    a non-transitory computer readable storage medium having non-transitory computer readable program code embodied in the medium, the computer readable program code comprising:
    computer readable program code configured to form a list of non-targeted UEs including other UEs in the first cell and cell edge UEs in a neighboring cell that borders the first cell that are located near a border of the first cell and the neighboring cell, the list including geographic locations and signal to interference plus noise ratios (SINRs) of the non-targeted UEs, computer readable program code configured to generate a list of candidate precoding matrices that can be used to communicate with the selected UE from the base station and/or from the remote radio head;

computer readable program code configured to discard from the list of candidate precoding matrices those precoding matrices that may cause interference to at least one non-targeted UE to generate a list of available precoding matrices;

computer readable program code configured to select a precoding matrix from the list of available precoding matrices; and computer readable program code configured to communicate with the selected UE using the selected precoding matrix.

* * * * *